US011098197B2

(12) United States Patent
Hoefl et al.

(10) Patent No.: US 11,098,197 B2
(45) Date of Patent: Aug. 24, 2021

(54) SILICONE COMPOSITIONS CROSSLINKABLE BY IRRADIATION WITH UV LIGHT

(71) Applicant: WACKER CHEMIE AG, Munich (DE)

(72) Inventors: Claus Hoefl, Altoetting (DE); Thomas Hierstetter, Burghausen (DE); Johann Schuster, Emmerting (DE); Kerstin Zeiler, Haiming (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 16/636,355

(22) PCT Filed: Aug. 4, 2017

(86) PCT No.: PCT/EP2017/069787
§ 371 (c)(1),
(2) Date: Feb. 4, 2020

(87) PCT Pub. No.: WO2019/025001
PCT Pub. Date: Feb. 7, 2019

(65) Prior Publication Data
US 2020/0299509 A1 Sep. 24, 2020

(51) Int. Cl.
| | |
|---|---|
| *C08F 2/46* | (2006.01) |
| *C08F 2/50* | (2006.01) |
| *C08G 61/04* | (2006.01) |
| *C08L 83/04* | (2006.01) |
| *C09D 183/04* | (2006.01) |
| *C09J 183/04* | (2006.01) |
| *C08K 5/50* | (2006.01) |
| *C08K 5/5357* | (2006.01) |

(52) U.S. Cl.
CPC ............ *C08L 83/04* (2013.01); *C09D 183/04* (2013.01); *C09J 183/04* (2013.01); *C08K 5/50* (2013.01); *C08K 5/5357* (2013.01)

(58) Field of Classification Search
CPC ....... C09D 183/04; C08L 83/04; C08L 83/00; C08K 5/49; C08K 5/56; C08K 5/5357; C08K 5/50; C09J 183/04
USPC ................. 522/66, 6, 71, 189, 184, 1; 520/1
See application file for complete search history.

(56) References Cited

U.S. PATENT DOCUMENTS

| | | | |
|---|---|---|---|
| 4,600,484 A * | 7/1986 | Drahnak | C07F 15/0086 204/157.74 |
| 4,692,540 A | 9/1987 | Illy et al. | |
| 6,251,969 B1 | 6/2001 | Woerner et al. | |
| 6,653,494 B2 | 11/2003 | Akbarali et al. | |
| 8,088,878 B2 * | 1/2012 | Koellnberger | C07F 17/02 528/15 |
| 2004/0116561 A1 * | 6/2004 | Ikeno | C08K 5/52 524/115 |
| 2009/0088524 A1 | 4/2009 | Koellnberger | |
| 2017/0349717 A1 * | 12/2017 | Ziche | C08K 5/56 |

FOREIGN PATENT DOCUMENTS

| | | | | |
|---|---|---|---|---|
| EP | 2239248 A2 | 10/2010 | | |
| GB | 944062 A | 12/1963 | | |
| JP | 2004204225 A | 7/2004 | | |
| JP | 2007308581 A | 11/2007 | | |
| WO | 2010009752 A1 | 1/2010 | | |
| WO | 2010009754 A1 | 1/2010 | | |
| WO | WO-2010009752 A1 * | 1/2010 | ............. | C08L 83/04 |
| WO | 2016030325 A1 | 3/2016 | | |

OTHER PUBLICATIONS

JP 2004-204225 A, US 2004/0116561 A1.
A.H. Ford-Moore et al., Triethyl Phosphite [Ethyl phosphite], Organic Syntheses, Coll., 1951, p. 111, vol. 31, Organic Syntheses, Inc., Rahway, New Jersey.
Mitsuo Sekine et al., Protection of Phosphonate Function by Means of Ethoxycarbonyl Group. A New Method for Generation of Reactive Silyl Phosphite Intermediates, Bulletin of The Chemical Society of Japan, 1982, pp. 239-242, vol. 55, No. 1, Chemical Society of Japan, Tokyo, Japan.
Ireneusz Kownacki et al., Effect of triorganophosphites on platinum catalyzed curing of silicon rubber, Applied Catalysis A: General, Apr. 14, 2009, pp. 106-114, vol. 362, Global Research Center, Schenectady, New York.
Yuehui Li et al., Highly Chemoselective Metal-Free Reduction of Phosphine Oxides to Phosphines, Journal of the American Chemical Society, Oct. 12, 2012, pp. 18325-18329, vol. 134, American Chemical Society, Washington, DC.
WO 2016/030325 A1, US 2017/0349717 A1.

\* cited by examiner

*Primary Examiner* — Jessica Whiteley
(74) *Attorney, Agent, or Firm* — Brooks Kushman P.C.

(57) ABSTRACT

Irradiation curable addition crosslinkable organosilicon compositions employ a cyclopentadienyl platinum photocatalyst, and are rendered storage stable by incorporation of selected organophosphorus compounds, while cure is substantially unaffected.

20 Claims, No Drawings

SILICONE COMPOSITIONS CROSSLINKABLE BY IRRADIATION WITH UV LIGHT

CROSS REFERENCE TO RELATED APPLICATIONS

This application is the U.S. National Phase of PCT Appln. No. PCT/EP2017/069787 filed Aug. 4, 2017, the disclosure of which is incorporated in its entirety by reference herein.

BACKGROUND OF THE INVENTION

1. Field of the Invention

The invention pertains to addition-crosslinkable silicone elastomers where crosslinking is induced by exposure to UV light.

2. Description of the Related Art

Addition-crosslinking silicone rubbers can be vulcanized in various ways. Thermally induced crosslinking is especially common. Light-induced, especially UV light-induced crosslinking is also used however.

Addition-crosslinking silicone compositions can be formulated as one-component or two-component systems. For the user, one-component systems have the major advantage that no mixing of two or more components has to be carried out. However, in order to be able to provide a thermally crosslinking system as one component, very high storage stability is required, i.e. long curing time at room temperature ("pot life") and/or also to some extent shipment and storage with cooling. Such a long pot life, for more than 6 months for example, can only be achieved by using specific platinum catalysts or a large amount of vulcanization retarders, so-called inhibitors. Inhibitors have the disadvantage, however, that they impair the crosslinking rate.

The use of specific platinum catalysts with phosphites as ligands in silicone compositions that can be crosslinked thermally by hydrosilylation is known from US 2009/0088524 A1. The pot lives are indeed improved in this case compared to customary platinum catalysts, such as the platinum-divinyltetramethylsiloxane complex (so-called Karstedt catalyst). The onset temperatures at which crosslinking starts also increase however.

In I. Kownacki et al., Applied Catalysis A: General 362 (2009) 106-114, triorganophosphites are used as inhibitors of platinum caltalysts, such as the Karstedt catalyst, in the thermal crosslinking of silicones via hydrosilylation, by means of which a long enough pot life is achieved. However, it should also be noted that use of these phosphites can result in prolongation of the crosslinking time.

Therefore, for curing one-component thermally crosslinkable silicone compositions or those having a very long pot life, in general very high temperatures of more than 100° C. are necessary, or alternatively very long full-curing times have to be accepted when using lower temperatures. For crosslinking at typically high temperatures, heat must be transferred to the rubber by heat-treatment ovens. This is not only very energy-intensive, but often simply also not possible. Some materials, with which the silicone compositions have to be brought into contact, already melt, modify or decompose at these temperatures. Especially in the field of the electrical industry, electronics industry and medical technology, combinations of silicone with these materials are of major importance however.

Compared to thermal crosslinking, UV-induced crosslinking has the advantage that only UV light is required as energy source and full curing after irradiation can occur very rapidly. The suitability of cyclopentadienyl complexes of platinum for UV-activated hydrosilylation is known, for example, from U.S. Pat. Nos. 4,600,484, 8,088,878 B2 and WO 2016/030325 A1. But even in the case of UV-crosslinking silicone rubber compositions, there may be instabilities which impair the storage life. The gel time of two-component compositions is often always shorter during storage, even on storage in the dark, i.e. they always start to gel more rapidly during the course of storage, whereas one-component compositions start to vulcanize.

Therefore, the object consisted of avoiding the disadvantages mentioned above and of providing silicone compositions having a good storage life even as one-component systems, of enabling rapid curing on irradiation, wherein the crosslinking rate remains largely unimpaired and curing takes place at room temperature, i.e. is possible at low-energy with avoidance of high temperatures. These and other objects are achieved by the invention.

SUMMARY OF THE INVENTION

The invention relates to silicone compositions that can be crosslinked by irradiation with light, preferably UV light, comprising (A) organosilicon compounds comprising Si—C-bonded radicals having aliphatic carbon-carbon multiple bonds, (B) organosilicon compounds comprising hydrogen atoms bonded to Si or instead of (A) and (B)

(C) organosilicon compounds comprising Si—C-bonded radicals having aliphatic carbon-carbon multiple bonds and hydrogen atoms bonded to Si, (D) platinum catalysts that can be activated by light of wavelength 200 to 500 nm, preferably UV light of wavelength 200 to 400 nm, selected from the group of cyclopentadienyl complexes of platinum and (E) organophosphorus compounds selected from the group of the formulae

  (I),

  (II),

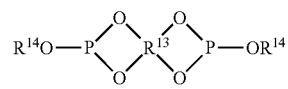  (III)

and mixtures thereof, wherein $R^{10}$ and $R^{11}$ are the same or different and are in each case a monovalent aliphatic or aromatic hydrocarbon radical having 1 to 100 carbon atoms, which may comprise heteroatoms selected from the group of O, N, Si, P, F, Cl and Br, $R^{12}$ is the same or different and is a monovalent hydrocarbon radical having 1 to 18 carbon atoms, $R^{13}$ is a tetravalent hydrocarbon radical having 5 to 30 carbon atoms, $R^{14}$ is the same or different and has the definition of $R^{10}$, s is 0, 1, 2 or 3, t is 0, 1, 2 or 3, with the proviso that the sum of s+t is equal to 3, u is 0 or 1, preferably 0, and i is 0 or 1, preferably 1.

DETAILED DESCRIPTION OF THE PREFERRED EMBODIMENTS

The radicals $R^{10}$ and $R^{11}$ in formula (I) are preferably a linear or branched alkyl radical having 1 to 31 carbon atoms, an alkenyl radical having 2 to 31 carbon atoms or an aryl or alkylaryl radical having 6 to 31 carbon atoms, preferably an alkyl radical of the formula $C_jH_{2j+1}$ where j=2-31 or an alkenyl radical of the formula $C_kH_{2k-1}$ where k=2-31 or an aryl or alkylaryl radical of the formula —(C_6H_{5-w})—(C_vH_{2v+1})_w where v=1-18 and w=0-5, wherein the hydrogen atoms in the alkyl, aryl or alkyaryl radical are not substituted or are substituted by the groups —$NH_2$, —COOH, —F, —Cl, -aryl, -alkyl, -alkoxy, -phenoxy, -alkylcarboxylic ester, or -alkycarboxamide.

Examples of radicals $R^{10}$ are the ethyl, propyl, phenyl, nonylphenyl, dinonylphenyl, 2-ethylhexyl, 2,4-di-tert-butylphenyl radical and 2-tert-butyl-4-methylphenyl radicals.

An example of an aromatic radical $R^{11}$ is the phenyl radical.

Examples of hydrocarbon radical $R^{11}$, which comprise the heteroatoms Si and O, are the trimethoxysilylmethyl radical and dimethoxy(methyl)silylmethyl radical.

Hydrocarbon radicals $R^{12}$ in formula (II) are preferably alkyl, alkenyl, aryl or alkaryl radicals.

Examples of radicals $R^{12}$ are the methyl, ethyl, n-propyl, isopropyl, n-butyl, tert-butyl and hexyl radicals, preference being given to the methyl and tert-butyl radical.

A preferred example of $R^{13}$ in formula (III) is the following radical of the formula $C(CH_2—)_4$:

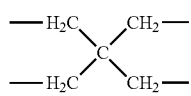

Examples of radicals $R^{14}$ in formula (III) are the octadecyl, 2,4-di-tert-butylphenyl, 2,6-di-tert-butyl-4-methylphenyl and stearyl radicals.

Organophosphorus compounds of the formula (I) are preferably those of the formula where u=0 and also s=3 and t=0 such as P[(OR^{10})]_3     (Ia)

or those of the formula where u=0 and t=3 and s=0 such as

P[R^{11}]_3.     (Ib)

Examples of organophosphorus compounds of the formulae (Ia) and (Ib) are
triethyl phosphite
triphenyl phosphite
tris(2,4-di-tert-butylphenyl) phosphite
tris(2-tert-butyl-4-methylphenyl) phosphite
tris(1-adamantanemethyl) phosphite
triisopropyl phosphite
triisodecyl phosphite
tris(2-ethylhexyl) phosphite
tris(nonylphenyl) phosphite
tris[(2-phenyl)phenyl] phosphite
tris[(3-phenyl)phenyl] phosphite
tris[(4-phenyl)phenyl] phosphite
tris[(5-phenyl)phenyl] phosphite
tris[(6-phenyl)phenyl] phosphite
tris[(2,4-diphenyl)phenyl] phosphite
tris[(2,6-diphenyl)phenyl] phosphite
tris[(3,5-diphenyl)phenyl] phosphite
tris(2,6-diisopropylphenyl) phosphite
tris(2-methylphenyl) phosphite
tris(2,4-dioctylphenyl) phosphite
tri(o-tolyl) phosphite
tricyclohexyl phosphite
trilauryl phosphite
diisodecylphenyl phosphite
2-ethylhexyldiphenyl phosphite
benzyldiphenylphosphine
tert-butyldiphenylphosphine
cyclohexyldiphenylphosphine
tri-n-butylphosphine
tri-tert-butylphosphine
tri-o-tolylphosphine
tri (p-tolyl)phosphine
tricylohexylphosphine
dimethyiphenylphosphine Further examples of formula (Ib), in which $R^{11}$ is an aliphatic or aromatic hydrocarbon radical substituted by heteroatoms P are
2,2'-bis(diphenylphosphino)-1,1'-binaphthalene
1,2-bis(dimethylphosphino)ethane and
ethylenebis(diphenylphosphine).

Examples of formula (I) where u=1 and s=2 and t=1, in which $R^{11}$ is an aliphatic or aromatic hydrocarbon radical substituted by heteroatoms Si and O are
[dimethoxy(methyl)silylmethyl]diethyl phosphonate
trimethoxysilylmethyldiethyl phosphonate and
diethylphosphonatopropyltrimethoxysilane,
the preparation of which is described for example in U.S. Pat. No. 7,884,224 B2.

Organophosphorus compounds of the formula (I) where u=0 can also be those in which s is 1, 2 or 3 and t is 1, 2 or 3, with the proviso that the sum of s+t=3.

$R^{11}$ can in this case be an aliphatic or aromatic hydrocarbon radical substituted by heteroatoms P and O of the formula —R*—P(OR^{10})_2,
wherein R* is a divalent aliphatic or aromatic hydrocarbon radical and $R^{10}$ has the definition specified therefor above. Formula (I) can therefore also be organophosphorus compounds of the formula (R^{10}O)_2P—R*—P(OR^{10})_2     (Ic).

An example of such an organophosphorus compound is

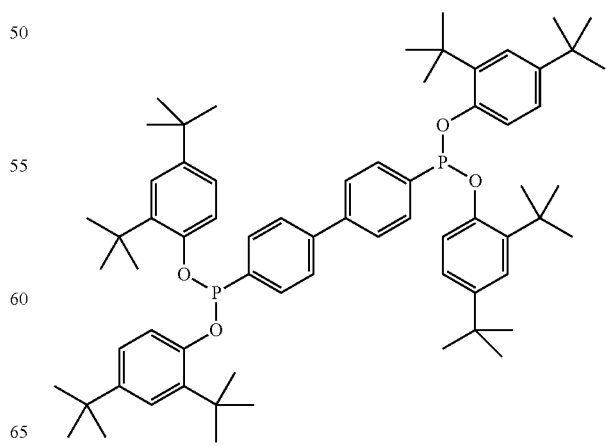

(tetrakis(2,4-di-tert-butylphenyl)-4,4'-biphenyldiphosphonite).

Examples of organophosphorus compounds of the formula (II) where i=1 or i=0 are
tris(tert-butyldimethylsilyl) phosphite
tris(trimethylsilyl) phosphite and
tris(trimethylsilyl)phosphine.

An example of the organophosphorus compound of the formula (III) is

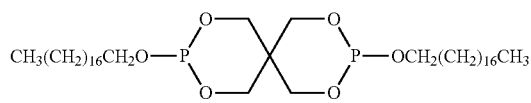

[3,9-bis(octadecyloxy)-2,4,8,10-tetraoxa-3,9-diphosphaspiro[5.5]undecane].

Further examples are
(3,9-bis(2,4-di-tert-butylphenoxy)-2,4,8,10-tetraoxa-3,9-diphosphaspiro[5.5]undecane)
distearyl pentaerythritol diphosphite
bis(2,6-di-tert-butyl-4-methylphenyl) pentaerythritol diphosphite The preparation of the organophosphorus compounds according to the invention is known, described for example in I. Kownacki et al., Applied Catalysis A: General 362 (2009) 106-114; U.S. Pat. No. 4,692,540 A; Y. Li et al., J. Am. Chem. Soc. 134 (2012) 18325-18329; GB 944 062 A; U.S. Pat. No. 6,653,494 B2; EP 2 239 248 A2; A. H. Ford-Moore et al., Org. Synth 31 (1951) 111; M. Sekine et al., Bull. Chem. Soc. Jpn. 55 (1982) 239-242 and are available commercially, for example from Sigma Aldrich Chemie GmbH, Eschenstr. 5, 82024 Taufkirchen.

The organophosphorus compounds (E) according to the invention are preferably used in the crosslinkable silicone compositions in amounts from 0.001 to 10,000 ppm by weight, preferably 1 to 1,000 ppm by weight, based in each case on the total weight of the silicone compositions.

In the crosslinkable silicone compositions according to the invention, the organosilicon compounds (A), comprising Si—C-bonded radicals having aliphatic carbon-carbon multiple bonds, are preferably linear or branched or resinous organopolysiloxanes composed of units of the formula $$R_a R^1_b SiO_{(4-a-b)/2} \qquad (IV),$$

wherein
R is the same or different and is a monovalent, optionally substituted, Si—C-bonded hydrocarbon radical having 1 to 18 carbon atoms per radical, free of aliphatic carbon-carbon multiple bonds and
$R^1$ is the same or different and is a monovalent Si—C-bonded hydrocarbon radical, comprising 2 to 10 carbon atoms per radical, having a terminal, aliphatic carbon-carbon multiple bond
a is 0, 1, 2 or 3,
b is 0, 1 or 2
and the sum of a+b is ≤3,
with the proviso that the organopolysiloxanes comprise at least 2 radicals $R^1$.

Examples of unsubstituted radicals R are alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical; alkenyl radicals such as the vinyl, allyl, n-5-hexenyl, 4-vinylcyclohexyl and the 3-norbornenyl radicals; cycloalkyl radicals such as cyclopentyl, cyclohexyl, 4-ethylcyclohexyl, cycloheptyl, norbornyl, and methylcyclohexyl radicals; aryl radicals such as the phenyl, biphenylyl, naphthyl radical; alkaryl radicals such as o-, m-, p-tolyl radicals and ethylphenyl radicals; and aralkyl radicals such as the benzyl radical and the alpha- and the beta-phenylethyl radicals.

Examples of substituted hydrocarbon radicals as radicals R are halogenated hydrocarbons such as the chloromethyl, 3-chloropropyl, 3-bromopropyl, 3,3,3-trifluoropropyl and 5,5,5,4,4,3,3-hexafluoropentyl radical and the chlorophenyl, dichlorophenyl and trifluorotolyl radicals.

R preferably has 1 to 6 carbon atoms.

Preferred examples of radicals R are the methyl and phenyl radicals.

Examples of radicals $R^1$ are the vinyl, allyl, methallyl, 1-propenyl, 5-hexenyl, ethynyl, butadienyl, hexadienyl, cyclopentenyl, cyclopentadienyl and cyclohexenyl radical, wherein preference is given to the vinyl and allyl radicals.

Constituent (A) can also be a mixture of organopolysiloxanes comprising different alkenyl groups, which differ, for example, in the content of alkenyl group, the type of the alkenyl group or differ structurally.

The structure of the organopolysiloxanes (A) comprising alkenyl groups can be linear, cyclic or also branched or resinous. The content of tri- and/or tetrafunctional units resulting in branched organopolysiloxanes is typically very low, preferably at most 20 mol %, especially at most 0.1 mol %.

Preferred organosilicon compounds (A) are organopolysiloxanes of the formula $$R^1 R_{3-d} SiO(SiR_2O)_n (SiRR^1O)_m SiR_{3-d} R^1_d \qquad (V)$$

wherein R and $R^1$ have the definition specified therefor above,
d is 0, 1, 2 or 3, preferably 1,
m is 0 or an integer from 1 to 200 and
n is 0 or an integer from 1 to 1800,
with the proviso that the organopolysiloxanes of the formula (V) comprise at least two radicals $R^1$.

In the context of this invention, formula (V) should be understood to mean that n —(SiRO)— units and m —(SiRR$^1$O)— units can be arranged in any desired manner in the organopolysiloxane molecule.

The organopolysiloxanes (A) have a viscosity at 25° C. of preferably 50 to 1,000,000 mPa·s, preferably 500 to 20,000 mPa·s. The viscosity is determined in accordance with DIN 53029.

The organosilicon compounds (B), comprising hydrogen atoms bonded to Si, are preferably linear, cyclic or branched organopolysiloxanes composed of units of the formula $$R_e H_f SiO_{(4-e-f)/2} \qquad (VI),$$

wherein
R has the definition specified therefor above,
e is 0, 1, 2 or 3,
f is 0, 1 or 2
and the sum of e+f is ≤3,
with the proviso that the organopolysiloxanes comprise at least 2 hydrogen atoms bonded to Si.

Preference is given to the use of an organosilicon compound (B) comprising three or more SiH bonds per molecule. In the case of exclusive use of an organosilicon compound (B) comprising only two SiH bonds per molecule, the use of an organopolysiloxane (A) having at least three alkenyl groups per molecule is recommended.

The hydrogen content of the organosilicon compound (B), which exclusively refers to the hydrogen atoms bonded directly to silicon atoms, is preferably in the range from 0.002 to 1.7% by weight Si-bonded hydrogen, preferably from 0.008 to 1.7% by weight Si-bonded hydrogen.

The organosilicon compounds (B) are preferably organopolysiloxanes of the formula

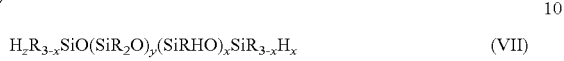
$$H_zR_{3-x}SiO(SiR_2O)_y(SiRHO)_xSiR_{3-x}H_x \quad (VII)$$

wherein
R has the definition specified therefor above,
x is 0, 1 or 2,
y is 0 or an integer from 1 to 1500 and
z is 0 or an integer from 1 to 200,
with the proviso that the organopolysiloxanes of the formula (VII) comprise at least 2 hydrogen atoms bonded to Si.

In the context of this invention, formula (VII) should be understood to mean that y —(SiR$_2$O)— units and z —(SiRHO)— units can be arranged in any desired manner in the organopolysiloxane molecule.

The organosilicon compounds (B) used according to the invention have a viscosity at 25° C. of preferably 10 to 20,000 mPa·s, preferably 20 to 1200 mPa·s.

The viscosity is determined in accordance with DIN 53029.

The organosilicon compound (B) is preferably used in amounts of from 0.3 to 5.0 mol, more preferably 0.45 to 3.0 mol, of Si-bonded hydrogen per mole of Si-bonded radical having aliphatic carbon-carbon multiple bond in the organosilicon compound (A).

Instead of organosilicon compounds (A) and (B), organosilicon compounds (C) can also be used.

The organosilicon compounds (C) used, comprising Si—C-bonded radicals having aliphatic carbon-carbon multiple bonds and hydrogen atoms bonded to Si, and which can be used instead of organosilicon compounds (A) and (B), are preferably those composed of units of the formula

$$R_hSiO_{(4-h)/2} \quad (VIII),$$

$$R_lR^1SiO_{(3-l)/2} \quad (IX) \text{ and}$$

$$R_rHSiO_{(3-r)/2} \quad (X),$$

wherein
R and R$^1$ have the definition specified therefor above,
h is 0, 1, 2 or 3,
l is 0, 1 or 2, and
r is 0, 1 or 2,
with the proviso that the organopolysiloxanes comprise at least two radicals R$^1$ and at least two hydrogen atoms bonded to Si.

Examples of organopolysiloxanes (C) are those composed of SiO$_{4/2}$—, R$_3$SiO$_{1/2}$—, R$_2$R$^1$SiO$_{1/2}$— and R$_2$HSiO$_{1/2}$— units, so-called MQ resins, wherein these resins may additionally comprise RSiO$_{3/2}$— and R$_2$SiO$_{2/2}$— units, and also linear organopolysiloxanes consisting largely of R$_2$R$^1$SiO$_{1/2}$—, R$_2$SiO$_{2/2}$— and RHSiO$_{2/2}$— units where R and R$^1$ have the same definition mentioned above.

The components (A), (B) and (C) used according to the invention are commercial products or can be prepared by methods common in chemistry.

The platinum catalysts (D) used are preferably cyclopentadienyl complexes of platinum of the formula (XI)

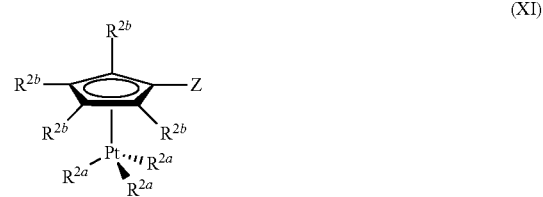

wherein
Z is a hydrogen atom or a linear or branched aliphatic hydrocarbon radical, preferably a methyl or allyl radical, or a radical of the formula

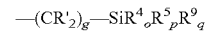
$$—(CR'_2)_g—SiR^4_oR^5_pR^9_q$$

wherein
g is an integer from 1 to 8,
o is 0, 1 or 2,
p is 0, 1, 2 or 3 and
q is 0, 1, 2 or 3
with the proviso that the sum of (o+p+q) is ≤3,
R' is the same or different and is a hydrogen atom or a monovalent, unsubstituted or substituted hydrocarbon radical, preferably a hydrogen atom,
R$^{2a}$ is the same or different and is an alkyl, aryl, arylalkyl or alkylaryl radical, which may be interrupted by heteroatoms such as O, N, S or P, wherein the hydrogens may be substituted by halogen atoms or radicals of the formula —SiR$^2_3$, wherein
R$^2$ is the same or different and is a monovalent, unsubstituted or substituted, linear, cyclic or branched hydrocarbon radical,
R$^{2b}$ is the same or different and is a hydrogen atom or a monovalent, unsubstituted or substituted, linear or branched, aliphatically saturated or unsaturated or aromatically unsaturated hydrocarbon radical, in which individual carbon atoms may be replaced by O, N, S or P atoms and which can form fused rings with the cyclopentadienyl radical, or one or more radicals R$^{2b}$ can be a radical of the formula —SiR$^3_3$, wherein
R$^3$ is the same or different and is a monovalent, unsubstituted or substituted, aliphatically saturated hydrocarbon radical, which may be interrupted by heteroatoms, or an aliphatically unsaturated, optionally substituted hydrocarbon radical or a siloxy radical bonded via oxygen,
R$^4$ is the same or different and is a hydrogen atom or a monovalent, unsubstituted or substituted, linear or branched, aliphatically saturated or unsaturated or aromatically unsaturated hydrocarbon radical, in which individual carbon atoms may be replaced by O, N, S or P atoms,
R$^5$ is the same or different and is a hydrolyzable functional group selected from the group of
carboxyl —O—C(O)R$^6$,
oxime —O—N=CR$^6_2$,
alkoxy —OR$^6$,
alkenyloxy —O—R$^8$
amide —NR$^6$—C(O)R$^7$,
amine —NR$^6$R$^7$,
aminoxy —O—NR$^6$R$^7$,
wherein
R$^6$ is the same or different and is an H atom or an alkyl, aryl, arylalkyl or alkylaryl radical,
R$^7$ is the same or different and is an alkyl, aryl, arylalkyl or alkylaryl radical, $R^8$ is a linear or branched, aliphatically unsaturated organic radical, preferably hydrocarbon radical, $R^9$ is the same or different and is a monovalent linear, cyclic or branched, oligomeric or polymeric organosilicon radical, which may comprise one or more groups selected from a) aliphatically saturated or unsaturated groups having 1 to 30 carbon atoms, in which individual carbon atoms may be replaced by halogen, O, N, S or P atoms, b) aromatic groups having 1 to 30 carbon atoms, in which individual carbon atoms may be replaced by halogen, O, N, S or P atoms, c) hydrogen atoms bonded to Si d) hydroxyl groups and e) hydrolyzable groups.

Examples of $R^4$ are alkyl radicals such as the methyl, ethyl, n-propyl, isopropyl, n-butyl, sec-butyl, isobutyl, tert-butyl, n-pentyl, sec-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,4,4-trimethylpentyl radical; nonyl radicals such as the n-nonyl radical; decyl radicals such as the n-decyl radical; dodecyl radicals such as the n-dodecyl radical; hexadecyl radicals such as the n-hexadecyl radical; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl, 2-propenyl, n-5-hexenyl, 4-vinylcyclohexyl and the 3-norbornenyl radicals; aryl radicals such as the phenyl, naphthyl, anthryl and phenanthryl radicals; alkaryl radicals such as the o-, m- and p-tolyl, xylyl, mesitylenyl and o-, m- and p-ethylphenyl radical; and aralkyl radicals such as the benzyl radical, and the α- and the β-phenylethyl radicals.

Examples of substituted radicals $R^4$ are haloalkyl radicals such as the 3,3,3-trifluoro-n-propyl radical, the 2,2,2,2',2',2'-hexafluoroisopropyl radical and the heptafluoroisopropyl radical, and haloaryl radicals such as the o-, m- and p-chlorophenyl radicals.

The radicals $R^4$ are preferably monovalent hydrocarbon radicals having 1 to 30 carbon atoms, which may be interrupted by heteroatoms such as O, N, S or P, more preferably monovalent aliphatic saturated hydrocarbon radicals having 1 or 8 carbon atoms, particularly the methyl or phenyl radicals, especially preferably the methyl radical.

Preferred radicals $R^5$ are carboxyl radical and alkoxy radicals, with particular preference being given to methoxy and ethoxy radicals.

The radical $R^9$ is preferably a siloxy radical bonded via oxygen.

Examples of siloxy radicals $R^9$ are linear or branched oligo- and polysiloxy radicals having 1 to 5000 siloxy units, which comprise dimethylsiloxy, phenylmethylsiloxy, diphenylsiloxy, methylsiloxy, phenylsiloxy or $SiO_{4/2}$ units and bear hydroxyl, trimethylsilyl, dimethylsilyl or vinyl end groups.

The siloxy radicals $R^9$ are preferably those of the formula

  (XII), wherein m is equal to an integer from 1 to 5000, preferably 8 to 1000, and $R^{9a}$ can be the same or different and has a definition specified for radical $R^4$.

Preferred examples of siloxy radicals $R^9$ are those of the formula

  (XIIa), wherein m has the definition specified therefor above, $R^{9b}$ is a methyl or phenyl radical and $R^{9c}$ is a methyl, vinyl or hydroxyl radical or an H atom bonded to Si.

Examples of radical R' are the hydrogen atom and the examples specified for unsubstituted radical $R^4$.

Preferred radicals $R^{2a}$ are aliphatic hydrocarbon radicals having 1 to 30 carbon atoms, optionally substituted by halogen atom, silyl radical or aryl radical, which may be interrupted by heteroatoms such as O, N, S or P, particularly preferably linear and branched alkyl radicals having 1 to 12 carbom atoms, especially the methyl radical.

The radical $R^{2b}$ is preferably an optionally substituted hydrocarbon radical, which may be interrupted by heteroatoms, and which is monovalent or polyvalent, preferably monovalent. Two or more monovalent radicals $R^{2b}$ can also form one or more rings, which are fused with the cyclopentadienyl radical and may be aromatic, saturated or aliphatically unsaturated. A polyvalent radical $R^4$ can also be bonded at more than one position on the cyclopentadienyl radical and form one or more rings, which are fused with the cyclopentadienyl radical and can be aromatic, saturated or aliphatically unsaturated.

Examples of radical $R^{2b}$ are the examples specified for radicals $R^4$ of monovalent, optionally substituted hydrocarbon radicals and SiC-bonded silyl radicals —$SiR^3_3$, such as trialkylsilyl radicals for example. Examples of fused rings formed by attached monovalent or divalent radicals $R^{2b}$ are benzene, naphthene, cyclopenta or cyclohexa groups.

The radicals $R^{2b}$ are preferably hydrogen or monovalent hydrocarbon radicals having 1 to 30 carbon atoms, optionally substituted by halogen atoms, which may be interrupted by heteroatoms such as O, N, S or P, or benzene radicals or trialkylsilyl radicals, more preferably hydrogen or monovalent, aliphatically saturated hydrocarbon radicals having 1 or 8 carbon atoms or benzene radicals, especially hydrogen or the methyl radical.

The radical $R^{2b}$ can also be a radical of the formula —$SiR^3_3$.

The radicals $R^3$ are preferably monovalent, aliphatically saturated hydrocarbon radicals having 1 to 30 carbon atoms, optionally substituted by halogen atoms, which may be interrupted by heteroatoms such as O, N, S or P, more preferably monovalent, aliphatic saturated hydrocarbon radicals having 1 or 8 carbon atoms, especially the methyl or phenyl radical, most preferably the methyl radical.

Examples of aliphatically unsaturated hydrocarbon radicals $R^3$ are the examples specified for radical $R^4$ of optionally substituted, aliphatically unsaturated hydrocarbon radicals.

Preferred examples of aliphatically unsaturated hydrocarbon radicals $R^3$ are radicals of the formula —$CR''_2$—$CR''$=$CR''_2$, wherein R'' can be the same or different and has a definition specified for radical R'.

The radicals R'' are preferably hydrogen or hydrocarbon radicals having 1 to 30 carbon atoms, more preferably hydrogen or linear saturated hydrocarbon radicals having 1 to 8 carbon atoms, especially the methyl radical or hydrogen, most preferably hydrogen.

The radical $R^3$ can also be a siloxy radical bonded via oxygen. Examples of siloxy radicals $R^9$, also those of the formulae (XII) and (XIIa), also apply to siloxy radicals $R^3$.

If $R^{2b}$ is a radical of the formula —SiR$^3{}_3$, then preferred examples are the trimethylsilyl radical, the dimethylallyl radical and siloxy radicals of the formula (XIIa).

The (methylcyclopentadienyl)trimethylplatinum complex (MeCp(PtMe$_3$)) is particularly preferred as platinum catalyst (D).

The platinum catalysts (D) and the preparation thereof are described, for example, in U.S. Pat. No. 8,088,878 B2 and WO 2016/030325 A1.

The platinum catalyst (D) can be used in any desired form, for example even in the form of microcapsules containing hydrosilylation catalyst, or organopolysiloxane particles such as described in U.S. Pat. No. 6,251,969 B1.

The content of platinum catalyst (D) is preferably selected such that the silicone composition according to the invention has a platinum metal content of 0.1 to 200 ppm by weight, preferably of 0.5 to 80 ppm by weight.

In addition to the aforementioned components (A), (B), (C), (D) and (E), further substances such as fillers (F) and additives (G) may also be present in the silicone compositions according to the invention.

The silicone compositions are preferably transparent below 500 nm, more preferably from 200 to 400 nm, so that a light-induced crosslinking of the silicone composition can take place by activating the platinum catalyst (D). The silicone compositions are therefore preferably free of light-absorbing fillers.

However, the silicone composition may also comprise filler (F). Examples of non-reinforcing fillers (F) are fillers having a BET surface area of up to 50 m$^2$/g, such as quartz, diatomaceous earth, calcium silicate, zirconium silicate, zeolites, metal oxide powder such as oxides of aluminum, titanium, iron, or zinc or mixed oxides thereof, barium sulfate, calcium carbonate, gypsum, silicon nitride, silicon carbide, boron nitride, glass and plastic powder. Reinforcing fillers, i.e. fillers having a BET surface area of at least 50 m$^2$/g, for example, are fumed silica, precipitated silica, carbon black such as furnace black and acetylene black and silicon-aluminum large BET surface area mixed oxides. Fibrous fillers are, for example, asbestos and plastic fibers. The fillers mentioned can be hydrophobized, for example by treatment with organosilanes or organosiloxanes or by etherification of hydroxyl groups to form alkoxy groups. One type of filler and also a mixture of at least two fillers may be used.

If the silicone compositions according to the invention comprise fillers (F), the proportion thereof is preferably 2 to 60% by weight, especially 5 to 50% by weight, based in each case on the total weight of the silicone composition according to the invention.

Examples of components (G) optionally used are all further additives which are useful for producing addition-crosslinkable compositions, such as resinous polyorganosiloxanes which are different from the siloxanes (A), (B) and (C), e.g. plasticizers, fungicides, fragrances, rheology additives, corrosion inhibitors, oxidation inhibitors, organic flame-retardant agents and agents for influencing the electrical properties which are different from the fillers (F), dispersants, solvents, adhesion promoters, color additives, crosslinking auxiliaries, plasticizers which are different from the siloxanes (A), (B) and (C), and heat stabilizers.

The additives (G) are preferably color additives, rheology additives, adhesion promoters, crosslinking auxiliaries and mixtures thereof.

If the silicone compositions according to the invention comprise additives (G), the amounts are preferably from 0 to 40% by weight, more preferably 1 to 20% by weight, and especially 1 to 5% by weight, based in each case on the total weight of the silicone compositions according to the invention.

The components used according to the invention can be in each case one type of such a component as well as a mixture of at least two types of a respective component.

The compositions according to the invention can be prepared by any desired manner known per se, such as by processes and mixed processes which are customary for producing addition-crosslinking compositions.

The present invention further relates to a method for preparing the compositions according to the invention by mixing the individual components in any desired sequence.

This mixing can take place at room temperature and atmospheric pressure, i.e. approximately 900 to 1100 hPa.

The mixing according to the invention is preferably carried out with exclusion of moisture and light with a wavelength of less than 400 nm.

The method according to the invention can be carried out continuously or batchwise.

In a preferred embodiment of the method according to the invention, a mixture of platinum catalyst (D) and component (E) are mixed uniformly with components (A), (B) and optionally (F) and optionally (G). The platinum catalyst (D) used according to the invention can in this case be used as a substance or as a solution in a suitable solvent, preferably dissolved in a small amount (A), and mixed with (E).

The compositions according to the invention can be either one-component silicone compositions or two-component silicone compositions. In the latter case, both components of the compositions according to the invention can comprise all constituents in any quantitive ratios. Preferably one component comprises the platinum catalyst (D) and no Si—H-containing component (B) or (C).

The crosslinking is preferably carried out at room temperature, preferably at 15° C. to 30° C., and at atmospheric pressure, i.e. approximately 900 to 1100 hPa.

The crosslinking is preferably initiated by irradiation, particularly by ultraviolet radiation (UV) at 200 to 400 nm, especially 250 to 350 nm. Depending on the formulation, the catalyst and the intensity of the UV radiation, the irradiation time required can be preferably less than 5 minutes, particularly preferably 10 seconds and less. Any radiation source can be used which has radiation fractions of below about 400 nm. It is preferable not to use wavelengths less than 200 nm. Conventional low-, medium- and high-pressure mercury lamps are suitable. Radiation sources such as fluorescent tubes and "black light lamps" are also suitable.

The silicone compositions according to the invention have the advantage that they have a surprisingly good shelf life with exclusion of light by the addition of the phosphorus compounds according to the invention, wherein the viscosities do not change over a long storage period, the gel times remain constant and the crosslinkable compositions thus show no tendency to vulcanization. This has the further advantage that, as a result, they can also be used as one-component systems. Unexpectedly, the crosslinking sets in directly and rapidly on irradiation and the crosslinking rate is not impaired or remains virtually unimpaired, and this is the case despite the use of the phosphorus compounds according to the invention which are known as inhibitors. The phosphorus compounds according to the invention are deactivated in this case by irradiation.

The phosphorus compounds according to the invention in this case differ in a surprising manner from other known inhibitors of platinum catalysts, such as ethynylcyclohexanol or 1,3-divinyltetramethyldisiloxane, with which no stabilization is achieved with exclusion of UV light on storage of UV-crosslinking silicone compositions.

The silicone compositions according to the invention have the further advantage that the crosslinking takes place at room temperature—thus low-energy requirement—through only a relatively brief irradiation with UV light, and no elevated temperatures are required, such that the silicone compositions according to the invention can be applied and vulcanized on temperature-sensitive substrates which are used, for example, in the field of the electrical industry, electronics industry and medical technology.

The invention further relates to the use of the silicone compositions that can be crosslinked for producing moldings, casting materials, adhesives or coatings.

They are produced by crosslinking the silicone compositions according to the invention by irradiation with light, especially UV light.

The invention further relates to a method for crosslinking the silicone compositions according to the invention by irradiation with light, preferably UV light, wherein the organophosphorus compounds (E) in this case lose their inhibiting effect by deactivation and the silicone compositions crosslink.

EXAMPLES

Examples are now shown using organophosphorus compounds which prove the positive effect of the substances specified on the storage stability of UV-crosslinking silicone compositions on storage thereof under exclusion of light.

As a measure of the storage stability, a gel time test employing a so-called gel timer was used, which proceeds at 120° C. and with exclusion of UV light.

Comparative Experiment 1

250 ml of a Mixture of 491 ppm trimethyl(methylcyclopentadienyl)platinum(IV) (CAS No. 94442-22-5; obtainable for example from Sigma Aldrich Chemie GmbH, Eschenstr. 5, 82024 Taufkirchen) in a silicone polymer (vinyl-terminal polydimethylsiloxane having a viscosity of 1000 mPas at 25° C.), corresponding to 300 ppm platinum, which was prepared by diluting an 8.18% by weight concentrate (=5% by weight platinum), is stored under exclusion of UV light. After determined time intervals, the gel time is determined at 120° C. by means of a gel timer (GELNORM, Saur) in accordance with DIN 16 945. The gel time is the time interval between the start of the test and the timepoint at which the catalyzed composition transforms from the liquid to the gel-like state.

This is determined under exclusion of UV light.

To determine the gel time, to the catalyst mixture in each case is added at a weight ratio of 9:1 an SiH-chain-internal polydimethylsiloxane, in which the proportion of hydrogen bonded to Si is 12 mol %, and the mixture is mixed for 15 min at 200 rpm in a laboratory paddle stirrer. The results are summarized in Table 1.

Examples 1 to 5

In Examples 1 to 5, the same test sequence is carried out as in comparative experiment 1 above, wherein subsequent to the addition of the catalyst concentrate, the appropriate amount of organophosphorus compound is added to the vinyl-terminal polydimethylsiloxane, the mixture is dissolved with stirring for 1 h at 200 rpm with a laboratory paddle stirrer (RE 162, Janke and Kunkel) and is then filtered through a 120 μm sieve. The gel time is determined as described in comparative example 1. The following organophosphorus compounds were tested:

(1) Triethyl phosphite (CAS No. 122-52-1)
(2) Triphenylphosphine (CAS No. 603-35-0)
(3) Tris(2,4-di-tert-butylphenyl) phosphite (CAS No. 31570-04-4)
(4) Tris(tert-butyldimethylsilyl) phosphite (CAS No. 85197-27-9)
(5) 3,9-Bis(octadecyloxy)-2,4,8,10-tetraoxa-3,9-diphosphaspiro[5.5]undecane (CAS No. 3806-34-6)

(1) to (5) are obtainable from Sigma Aldrich Chemie GmbH, Eschenstr. 5, 82024 Taufkirchen The results are summarized in Table 1.

TABLE 1

Gel time test using inventive organophosphorus compounds

| Storage time | Comparative experiment 1 No additive | Example 1 300 ppm by weight (1) triethyl phosphite | Example 2 300 ppm by weight (2) triphenylphosphine | Example 3 300 ppm by weight (3) tris(2,4-di-tert-butyl-phenyl) phosphite | Example 4 300 ppm by weight (4) tris(tert-butyldimethylsilyl) phosphite | Example 5 300 ppm by weight (5) 3,9-bis(octa-decyloxy)-2,4,8,10-tetraoxa-3, 9-diphosphaspiro [5.5]undecane |
|---|---|---|---|---|---|---|
| Zero | 11:48 min | 3 h 30 min | 7 h 37 min | 1 h 30 min | 11 h 38 min | 1 h 39 min |
| 1 Week | 07:50 min | 3 h 21 min | 4 h 13 min | 1 h 29 min | 13 h 31 min | 1 h 19 min |
| 4 Weeks | 05:21 min | 1 h 41 min | 4 h 45 min | 1 h 30 min | 15 h 55 min | 1 h 8 min |
| 8 Weeks | 04:20 min | 1 h 53 min | 3 h 29 min | 1 h 21 min | 15 h 2 min | 1 h 18 min |
| 3 Months | 03:49 min | 1 h 56 min | 3 h 49 min | 1 h 19 min | 12 h 24 min | 1 h 16 min |
| 4 Months | 03:00 min | 2 h 3 min | 3 h 36 min | 1 h 16 min | 12 h 24 min | 1 h 15 min |
| 5 Months | — | 2 h 16 min | 3 h 31 min | 1 h 8 min | 11 h 20 min | 1 h 12 min |
| 6 Months | — | 2 h 14 min | 4 h 19 min | 1 h 3 min | — | — |

As can be seen from Table 1, the phosphorus compounds according to the invention, compared to the mixture without addition of a phosphorus compound, result in a prolongation of the gel time to some extent to a different but very high level and therefore to stabilization over several months.

The five organophosphorus compounds according to Examples 1-5 are examples of an entire substance group. Examples of further phosphorus compounds now follow. The experiments described in Examples 1-5 can also be carried out using these compounds. A similar effect on the storage stability can be anticipated:

triphenyl phosphite
tris(2-tert-butyl-4-methylphenyl) phosphite
tris(1-adamantanemethyl) phosphite
triisopropyl phosphite
triisodecyl phosphite
tris(2-ethylhexyl) phosphite
3,9-bis(2,4-di-tert-butylphenoxy)-2,4,8,10-tetraoxa-3,9-diphosphaspiro[5.5]undecane
distearylpentaerythritol diphosphite
bis(2,6-di-tert-butyl-4-methylphenyl)pentaerythritol diphosphite
tris(nonylphenyl) phosphite
tris[(2-phenyl)phenyl] phosphite
tris[(3-phenyl)phenyl] phosphite
tris[(4-phenyl)phenyl] phosphite
tris[(5-phenyl)phenyl] phosphite
tris[(6-phenyl)phenyl] phosphite
tris[(2,4-diphenyl)phenyl] phosphite
tris[(2,6-diphenyl)phenyl] phosphite
tris[(3,5-diphenyl)phenyl] phosphite
tris(2,6-diisopropylphenyl) phosphite
tris(2-methylphenyl) phosphite
tris(2,4-dioctylphenyl) phosphite
tri(o-tolyl) phosphite
tricyclohexyl phosphite
trilauryl phosphite
diisodecylphenyl phosphite
2-ethylhexyldiphenyl phosphite
diethylphosphonatopropyltrimethoxysilane
[dimethoxy(methyl)silylmethyl]diethyl phosphonate
trimethoxysilylmethyldiethyl phosphonate
tetrakis(2,4-di-tert-butylphenyl)-4,4'-biphenyl diphosphonite
benzyldiphenylphosphine
tert-butyldiphenylphosphine
cyclohexyldiphenylphosphine
tri-n-butylphosphine
tri-tert-butyl-phosphine
tri-o-tolylphosphine
tri(p-tolyl)phosphine
tricylohexylphosphine
dimethylphenylphosphine
2,2'-bis(diphenylphosphino)-1,1'-binaphthalene
1,2-bis(dimethylphosphino)ethane
ethylenebis(diphenylphosphine)
tris(trimethylsilyl)phosphine Comparative Experiments 2 to 5

The experimental procedure of the gel time test is carried out as described in Examples 1 to 5. However, instead of the phosphorus compound according to the invention, 1,3-divinyltetramethyldisiloxane or ethynylcyclohexanol, which are known inhibitors of platinum catalysts according to the prior art, was added in the amounts specified in each case in Table 2 or 3 (comparative experiments 2/3 or 4/5). Comparative experiment 1 served as reference. The results are summarized in Tables 2 and 3.

TABLE 2

Gel time test using 1,3-divinyltetramethyldisiloxane

| Storage time | Comparative experiment 1 No additive | Comparative experiment 2 Addition of 240 ppm by weight | Comparative experiment 3 Addition of 480 ppm by weight |
|---|---|---|---|
| Zero | 11:48 min | 22:12 min | 31:00 min |
| 1 Week | 07:50 min | 16:01 min | 22:00 min |
| 4 Weeks | 05:21 min | 5:30 min | 8:00 min |
| 8 Weeks | 04:20 min | 4:49 min | 6:21 min |
| 3 Months | 03:49 min | 3:29 min | 4:31 min |
| 4 Months | 03:00 min | 3:27 min | 4:17 min |
| 5 Months | — | 3:20 min | 4:09 min |
| 6 Months | — | 2:49 min | 3:49 min |

TABLE 3

Gel time test using ethynylcyclohexanol

| Storage time | Comparative experiment 1 No additive | Comparative experiment 4 Addition of 5 ppm by weight | Comparative experiment 5 Addition of 14 ppm by weight |
|---|---|---|---|
| Zero | 11:48 min | 13:41 min | 1 h 47 min |
| 1 Week | 07:50 min | 7:41 min | 44:10 min |
| 4 Weeks | 05:21 min | 3:32 min | 10:20 min |
| 8 Weeks | 04:20 min | 3:29 min | 10:41 min |
| 3 Months | 03:49 min | 3:28 min | 7:31 min |
| 4 Months | 03:00 min | 3:19 min | 8:30 min |
| 5 Months | — | — | 8:40 min |
| 6 Months | — | — | 8:00 min |

On addition of 1,3-divinyltetramethyldisiloxane and ethynylcyclohexanol, which are used in the prior art for regulating the crosslinking rate, the storage stability diminished significantly after one week. A sustainedly stable state cannot be achieved, as in the case of addition of the organophosphorus compounds according to the invention.

Comparative Experiment 6 and 7

The experimental procedure of the gel time test is carried out as described in Examples 1 to 5. However, instead of the phosphorus compound according to the invention, trioctylamine or 1,3-divinyltetramethyldisilazane, which are known inhibitors of platinum catalysts according to the prior art, was added in the amount specified in Table 4 or 5 (comparative experiment 6 or 7). Comparative experiment 1 served as reference. The results are summarized in Tables 4 and 5.

TABLE 4

Gel time test using trioctylamine

| Storage time | Comparative experiment 1 No additive | Comparative experiment 6 Addition of 300 ppm by weight |
|---|---|---|
| Zero | 11:48 min | 14:02 min |
| 1 Week | 07:50 min | 4:59 min |
| 4 Weeks | 05:21 min | 2:38 min |
| 8 Weeks | 04:20 min | — |
| 3 Months | 03:49 min | — |
| 4 Months | 03:00 min | — |
| 5 Months | — | — |

TABLE 5

Gel time test using 1,3-divinyltetramethyldisilazane

| Storage time | Comparative experiment 1 No additive | Comparative experiment 7 Addition of 10 ppm by weight |
|---|---|---|
| Zero | 11:48 min | 14:10 min |
| 1 Week | 07:50 min | 3:50 min |
| 4 Weeks | 05:21 min | 3:39 min |
| 8 Weeks | 04:20 min | 2:38 min |
| 3 Months | 03:49 min | — |
| 4 Months | 03:00 min | — |
| 5 Months | — | — |

On addition of 1,3-divinyltetramethyldisilazane and tri-octylamine, the mixtures are not storage-stable and even still result in greater instability than in the mixtures without additive. Apparently, these substances result in an irreversible decomposition of the UV-active platinum complex.

Comparative Experiment 8 and Examples 6 to 8

To assess the UV activity, the pot life (=the time to reach a viscosity of 300,000 mPas at 25° C.) was determined according to ISO 6721-10 (complex shear viscosity using a parallel plate oscillation rheometer) in a rheometer from Anton Paar MCR 302 after 60 seconds irradiation with 6 mW (emitter: Omnicure S1000, 320-500 nm; distance to sample: 22 mm) of the following mixture:
mixture of 9.1% by weight of a catalyst mixture of trimethyl (methylcyclopentadienyl)platinum(IV) in a silicone polymer (vinyl-terminal polydimethylsiloxane, viscosity 1000 mPas at 25° C.) described in Examples 1-5, the organophosphorus compounds specified in Table 6 (Examples 6-8, amounts based on the end composition) or without additive (comparative experiment 8) and 90.9% by weight of a preparation crosslinkable by hydrosilylation comprising linear and branched SiH- and vinyl-functional siloxanes (commercially sold under the name SEMICOSIL® 912 by Wacker Chemie AG, Munich, Germany). Mixing time for batch size of 22 g: 20 s at 2500 rev/min using Speedmixer DAC 150 FV, Hauschild.
Instrument settings from Anton Paar MCR 302:
Temperature: 25° C.
Measurement mode: oscillation
Measurement gap: 0.2 mm
Deformation: 0.1%
Frequency: 0.5 Hz
Sample volume: 0.4 ml
In addition, the catalyst mixture with organophosphorus compound according to the invention was in each case stored for 6 months at 25° C. with exclusion of light, and then the pot life was determined after addition of the crosslinkable preparation of SiH- and vinyl-functional siloxanes mentioned above (SEMICOSIL® 912 from Wacker-Chemie), in analogy to that described above. The results are summarized in Table 6.

The hardness is determined by a penetration measurement in accordance with DIN ISO 2137 (Penetrometer PNR 12, Saur, Anton-Paar, cone 9.38 g, penetration time 5 sec). For this purpose, to assess the UV activity, 50 g of the mixture specified above (mixing parameter: 100 g of mixture in a 150 ml beaker in a Speedmixer DAC 150 FV, Hauschild, 60 sec at 2500 rev/min) is placed in a 125 ml beaker and is vulcanized after irradiation at 70 mW/cm² (UVACUBE 2000, Hönle, 230-400 nm) for 10 sec and after heat treatment at 150° C. for 30 minutes. The results are summarized in Table 6.

TABLE 6

|  | Comp. experiment 8 No additive | Example 6 Plus (1) triethyl phosphite (27 ppm by weight) | Example 7 Plus (2) triphenylphos- phine (27 ppm by weight) | Example 8 Plus (3) tris(2,4-di- tert-butyl- phenyl) phosphite (27 ppm by weight) |
|---|---|---|---|---|
| Pot life | 372 s | 717 s | 797 s | 665 s |
| Penetration | 58¹/₁₀ mm | 62¹/₁₀ mm | 63¹/₁₀ mm | 61¹/₁₀ mm |
| Pot life (6 months' storage) | 447 s | 601 s | 780 s | 656 s |

The mixtures vulcanize without any problem after UV irradiation and the retarding of the crosslinking by the organophosphorus compounds used is within acceptable bounds. The penetration of the vulcanizate is virtually unchanged compared to the reference sample (without additive). The pot lives have barely changed after storage for 6 months.

Example 9

In further experiments to clarify the processes on irradiation with UV light, a catalyst mixture comprising 491 ppm by weight trimethyl(methylcyclopentadienyl)platinum(IV) (=300 ppm by weight platinum) in vinyl-terminal polydimethylsiloxane having a viscosity of 1000 mPas at 25° C.) and various amounts of tris(2,4-di-tert-butylphenyl) phosphite was prepared and irradiated with 70 mW/cm² for 10 sec. The tris(2,4-di-tert-butylphenyl) phosphite content was determined before and after irradiation by ¹H-NMR by evaluating the signal of the tert-butyl group ($\delta$=1.3 ppm, $CDCl_3$, 500 MHz, 300 K). The results are summarized in Table 7.

TABLE 7

|  | Content before irradiation | Content after irradiation |
|---|---|---|
| Tris(2,4-di-tert-butylphenyl) phosphite | 288 ppm | 0 ppm |
| Tris(2,4-di-tert-butylphenyl) phosphite | 448 ppm | 0 ppm |
| Tris(2,4-di-tert-butylphenyl) phosphite | 47 ppm | 0 ppm |

As can be shown in Table 7, the phosphorus compound is deactivated by irradiation under the boundary conditions typical for the crosslinking (irradiation intensity and duration) and is no longer detectable after irradiation.

Comparative Experiment 9 and Examples 10 to 12

One-component mixtures were also formulated with some of the inventive organophosphorus compounds and the viscosity development during storage was monitored. The mixtures were prepared as follows: a mixture of 9.1% by weight of a catalyst mixture in a silicone polymer (vinyl-terminal polydimethylsiloxane) described in Examples 1-5, the organophosphorus compounds specified in Table 8 in the amounts specified in Table 8 (Examples 10-12, amounts based on the end composition) or without additive (comparative experiment 9) and 90.9% by weight of a preparation crosslinkable by hydrosilylation comprising linear and branched SiH- and vinyl-functional siloxanes (commercially sold under the name SEMICOSIL® 912 by Wacker Chemie AG, Munich, Germany) were prepared in a 150 ml PE beaker, stirred for 60 sec at 2500 rev/min in the Speedmixer and stored with the exclusion of light. After determined time intervals, the viscosity was determined using a plate-cone viscometer (Anton-Paar MCR 302) in accordance with DIN 53019 (measurement of viscosities and flow curves with rotation viscometers) (sample amount: 0.5 ml, measurement time: 3 min, measurement values: 30, cone CP50-2, temp. 25° C.).

The results are summarized in Table 8.

TABLE 8

| Storage time | Comp. experiment 9 No additive | Example 10 27 ppm by weight (2) triphenyl-phosphine | Example 11 27 ppm by weight (3) tris(2,4-di-tert-butylphenyl) phosphite | Example 12 4.5 ppm by weight (3) tris(2,4-di-tert-butylphenyl) phosphite |
|---|---|---|---|---|
| Zero | 1030 mPas | 1090 mPas | 1090 mPas | 1100 mPas |
| 3 Days | 1050 mPas | 1090 mPas | 1090 mPas | 1090 mPas |
| 9 Weeks | 3183 mPas | 1099 mPas | 1100 mPas | 1090 mPas |
| 12 Weeks | 6340 mPas | 1140 mPas | 1099 mPas | 1111 mPas |
| 13 Weeks | 7736 mPas | 1093 mPas | 1090 mPas | 1101 mPas |
| 14 Weeks | 8808 mPas | 1096 mPas | 1099 mPas | 1094 mPas |
| 16 Weeks | 13079 mPas | 1095 mPas | 1077 mPas | 1092 mPas |
| 17 Weeks | 15822 mPas | 1102 mPas | 1090 mPas | 1110 mPas |
| 19 Weeks | vulcanized | 1105 mPas | 1099 mPas | 1099 mPas |
| 25 Weeks | vulcanized | 1132 mPas | 1103 mPas | 1121 mPas |
| 28 Weeks | vulcanized | 1149 mPas | 1100 mPas | 1107 mPas |
| 30 Weeks | vulcanized | 1167 mPas | 1091 mPas | 1116 mPas |
| 36 Weeks | vulcanized | 1223 mPas | 1090 mPas | 1112 mPas |

The viscosity remains stable on addition of an organophosphorus compound according to the invention over a time period of about 30 weeks, whereas in a mixture without additive a significant increase in viscosity is already discernible after a few weeks and complete vulcanization occurs at the latest after 19 weeks.

The invention claimed is:

1. Silicone compositions of improved storage stability, crosslinkable by hydrosilylation which is initiated by irradiation with light, comprising:
   (A) organosilicon compound(s) comprising Si—C-bonded radicals having aliphatic carbon-carbon multiple bonds;
   (B) organosilicon compound(s) comprising hydrogen atoms bonded to Si; and (C) instead of (A) and (B) or in addition to (A), (B), or a mixture of (A) and (B), organosilicon compounds comprising Si—C-bonded radicals having aliphatic carbon-carbon multiple bonds and hydrogen atoms bonded to Si;
   (D) a platinum catalyst which is activatable by light of a wavelength of 200 to 500 nm and which comprises a cyclopentadienyl complex of platinum; and
   (E) at least one organophosphorus compound of one of the formulae)

$$P(=O)_u[(OR^{10})]_s[R^{11}]_t \quad (I),$$

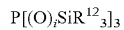

$$P[(O)_i SiR^{12}{}_3]_3 \quad (II),$$

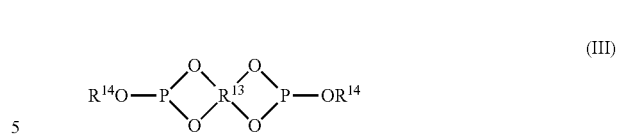

and mixtures thereof, wherein
$R^{10}$ and $R^{11}$ are the same or different and are in each case an alkyl radical of the formula $C_j H_{2j+1}$ where j=2-31 or an alkenyl radical of the formula $C_k H_{2k-1}$ where k=2-31 or an aryl or alkylaryl radical of the formula —$(C_6 H_{5-w})$—$(C_v H_{2v+1})_w$ where v=1-18 and w=0-5,
$R^{12}$ is the same or different and is a monovalent hydrocarbon radical having 1 to 18 carbon atoms,
$R^{13}$ is a tetravalent hydrocarbon radical having 5 to 30 carbon atoms,
$R^{14}$ is the same or different and has the definition of $R^{10}$,
s is 0, 1, 2 or 3,
t is 0, 1, 2 or 3,
with the proviso that the sum of s+t=3,
u is 0 or 1, and
i is 0 or 1.

2. The silicone composition of claim 1, wherein u is 0 and i is 1.

3. The silicone composition of claim 1, wherein the organophosphorus compound(s) (E) are used in amounts from 0.001 to 10,000 ppm by weight, based in each case on the total weight of the silicone composition.

4. The silicone composition of claim 1, wherein the organophosphorus compound(s) (E) are used in amounts from 1 to 1,000 ppm by weight, based in each case on the total weight of the silicone composition.

5. The silicone compositions of claim 1, wherein
   $R^{10}$ is an ethyl, propyl, phenyl, nonylphenyl, dinonylphenyl, 2-ethylhexyl, 2,4-di-tert-butylphenyl radical or 2-tert-butyl-4-methylphenyl radical,
   $R^{11}$ is a phenyl radical,
   $R^{12}$ is a methyl, ethyl, n-propyl, isopropyl, n-butyl, tert-butyl or hexyl radical, preferably a methyl or tert-butyl radical,
   $R^{13}$ is a radical of the formula $C(CH_2)_4$— and
   $R^{14}$ is an octadecyl, 2,6-di-tert-butyl-4-methylphenyl or a 2,4-di-tert-butylphenyl radical.

6. The silicone composition of claim 1, wherein at least one of the organophosphorus compound(s) (E) is tris(2,4-di-tert-butylphenyl) phosphite, triethyl phosphite, triphenylphosphine, tris(tert-butyldimethylsilyl) phosphite, or 3,9-bis(octadecyloxy)-2,4,8,10-tetraoxa-3,9-diphosphaspiro[5.5]undecane.

7. The silicone composition of claim 1, wherein the organosilicon compound(s) (A) comprise linear, branched, or resinous organopolysiloxanes comprising units of the formula

$$R_a R^1{}_b SiO_{(4-a-b)/2} \quad (IV),$$

wherein
R is the same or different and is a monovalent, optionally substituted, Si—C-bonded hydrocarbon radical having 1 to 18 carbon atoms per radical, free of aliphatic carbon-carbon multiple bonds and
$R^1$ is the same or different and is a monovalent Si—C-bonded hydrocarbon radical, comprising 2 to 10 carbon atoms per radical, having a terminal, aliphatic carbon-carbon multiple bond
a is 0, 1, 2 or 3,
b is 0, 1 or 2
and the sum of a+b is ≤3, with the proviso that the organopolysiloxanes comprise at least 2 radicals $R^1$.

8. The silicone composition of claim 1, wherein the organosilicon compound(s) (A) comprise organopolysiloxanes of the formula $$R^1{}_d R_{3-d} SiO(SiR_2O)_n(SiRR^1O)_m SiR_{3-d}R^1{}_d \qquad (V)$$

wherein

R is the same or different and is a monovalent, optionally substituted, Si—C-bonded hydrocarbon radical having 1 to 18 carbon atoms per radical, free of aliphatic carbon-carbon multiple bonds and $R^1$ is the same or different and is a monovalent Si—C-bonded hydrocarbon radical, comprising 2 to 10 carbon atoms per radical, having a terminal, aliphatic carbon-carbon multiple bond d is 0, 1, 2 or 3, m is 0 or an integer from 1 to 200 and n is 0 or an integer from 1 to 1800, with the proviso that the organopolysiloxanes of the formula (V) comprise at least two radicals $R^1$.

9. The silicone compositions of claim 1, wherein the organosilicon compound(s) (B) comprise linear, cyclic, or branched organopolysiloxanes comprising units of the formula $$R_e H_f SiO_{(4-e-f)/2} \qquad (VI),$$

wherein

R is the same or different and is a monovalent, optionally substituted, Si—C-bonded hydrocarbon radical having 1 to 18 carbon atoms per radical, free of aliphatic carbon-carbon multiple bonds, and e is 0, 1, 2 or 3, f is 0, 1 or 2 and the sum of e+f is ≤3, with the proviso that the organopolysiloxanes comprise at least 2 hydrogen atoms bonded to Si.

10. The silicone composition of claim 1, wherein the organosilicon compound(s) (B) comprise organopolysiloxanes of the formula $$H_x R_{3-x} SiO(SiR_2O)_y(SiRHO)_z SiR_{3-x}H_x \qquad (VII)$$

wherein

R is the same or different and is a monovalent, optionally substituted, Si—C-bonded hydrocarbon radical having 1 to 18 carbon atoms per radical, free of aliphatic carbon-carbon multiple bonds, and x is 0, 1 or 2, y is 0 or an integer from 1 to 1500 and z is 0 or an integer from 1 to 200, with the proviso that the organopolysiloxanes of the formula (VII) comprise at least 2 hydrogen atoms bonded to Si.

11. The silicone composition of claim 1, wherein the platinum catalysts (D) comprise cyclopentadienyl complexes of platinum of the formula (XI)

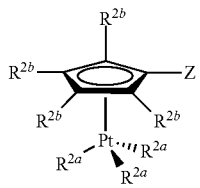

(XI)

wherein

Z is hydrogen or a linear or branched aliphatic hydrocarbon radical or a radical of the formula $$-(CR'_2)_g-SiR^4{}_o R^5{}_p R^9{}_q$$

wherein g is an integer from 1 to 8, o is 0, 1 or 2, p is 0, 1, 2 or 3 and q is 0, 1, 2 or 3 with the proviso that the sum of (o+p+q) is ≤3,

R' is the same or different and is hydrogen or a monovalent, unsubstituted or substituted hydrocarbon radical, $R^{2a}$ is the same or different and is an alkyl, aryl, arylalkyl or alkylaryl radical, optionally interrupted by heteroatoms O, N, S or P, wherein the hydrogens are optionally substituted by halogen atoms or radicals of the formula —$SiR^2{}_3$, wherein $R^2$ is the same or different and is a monovalent, unsubstituted or substituted, linear, cyclic or branched hydrocarbon radical, $R^{2b}$ is the same or different and is hydrogen or a monovalent, unsubstituted or substituted, linear or branched, aliphatically saturated or unsaturated or aromatically unsaturated hydrocarbon radical, in which individual carbon atoms are optionally replaced by O, N, S or P atoms and which can form fused rings with the cyclopentadienyl radical, or one or more radicals $R^{2b}$ is optionally a radical of the formula —$SiR^3{}_3$, wherein $R^3$ is the same or different and is a monovalent, unsubstituted or substituted, aliphatically saturated hydrocarbon radical, optionally interrupted by heteroatoms, or an aliphatically unsaturated, optionally substituted hydrocarbon radical or a siloxy radical bonded via oxygen, $R^4$ is the same or different and is a hydrogen atom or a monovalent, unsubstituted or substituted, linear or branched, aliphatically saturated or unsaturated or aromatically unsaturated hydrocarbon radical, in which individual carbon atoms are optionally replaced by O, N, S or P atoms, $R^5$ is the same or different and is a hydrolyzable functional group:
carboxyl —O—C(O)$R^6$,
oxime —O—N=$CR^6{}_2$,
alkoxy —$OR^6$,
alkenyl oxy —O—$R^8$
amide —$NR^6$—C(O)$R^7$,
amine —$NR^6R^7$, or
aminoxy —O—$NR^6R^7$, wherein $R^6$ is the same or different and is H or an alkyl, aryl, arylalkyl or alkylaryl radical, $R^7$ is the same or different and is an alkyl, aryl, arylalkyl or alkylaryl radical, $R^8$ is a linear or branched, aliphatically unsaturated organic radical, $R^9$ is the same or different and is a monovalent linear, cyclic or branched, oligomeric or polymeric organosilicon radical, which optionally contains one or more groups a)-e)

a) aliphatically saturated or unsaturated groups having 1 to 30 carbon atoms, in which individual carbon atoms are optionally replaced by halogen, O, N, S or P atoms, b) aromatic groups having 1 to 30 carbon atoms, in which individual carbon atoms are optionally replaced by halogen, O, N, S or P atoms,
c) hydrogen atoms bonded to Si
d) hydroxyl groups, or
e) hydrolyzable groups.

12. The silicone composition of claim 1, wherein a (methylcyclopentadienyl)trimethylplatinum complex is used as a platinum catalyst (D).

13. A method for preparing a silicone composition of claim 1, comprising mixing together:
(A) organosilicon compounds comprising Si—C-bonded radicals having aliphatic carbon-carbon multiple bonds,
(B) organosilicon compounds comprising hydrogen atoms bonded to Si, and (C) instead of (A) and (B) or in addition to (A), (B), or a mixture of (A) and (B), organosilicon compounds comprising Si—C-bonded radicals having aliphatic carbon-carbon multiple bonds and hydrogen atoms bonded to Si,
(D) a platinum catalyst activatable by light of wavelength 200 to 500 nm which comprise cyclopentadienyl complex of platinum, and
(E) an organophosphorus compound of one of the formulae (I), (II) and/or (III).

14. In a process for producing moldings, casting materials, adhesives or coatings from crosslinkable organosilicon compounds; the improvement comprising employing a crosslinkable composition of claim 1.

15. A method for crosslinking a silicone composition of claim 1, comprising irradiating with light, wherein the organophosphorus compound(s) (E) lose their inhibiting effect by deactivation and the silicone compositions crosslink.

16. Silicone compositions of improved storage stability, crosslinkable by hydrosilylation which is initiated by irradiation with light, comprising:
(A) organosilicon compound(s) comprising Si—C-bonded radicals having aliphatic carbon-carbon multiple bonds;
(B) organosilicon compound(s) comprising hydrogen atoms bonded to Si; and (C) instead of (A) and (B) or in addition to (A), (B), or a mixture of (A) and (B), organosilicon compounds comprising Si—C-bonded radicals having aliphatic carbon-carbon multiple bonds and hydrogen atoms bonded to Si;
(D) a platinum catalyst which is activatable by light of a wavelength of 200 to 500 nm and which comprises a cyclopentadienyl complex of platinum; and
(E) an organophosphorus compound of one of the formulae)

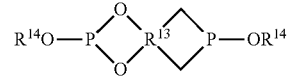

and mixtures thereof, wherein
$R^{10}$ and $R^{11}$ are the same or different and are in each case an alkyl radical of the formula $C_jH_{2j+1}$ where j=2-31 or an alkenyl radical of the formula $C_kH_{2k-1}$ where k=2-31 or an aryl or alkylaryl radical of the formula $-(C_6H_{5-w})-(C_vH_{2v+1})_w$ where v=1-18 and w=0-5,
$R^{12}$ is the same or different and is a monovalent hydrocarbon radical having 1 to 18 carbon atoms,
$R^{13}$ is a tetravalent hydrocarbon radical having 5 to 30 carbon atoms,
$R^{14}$ is the same or different and has the definition of $R^{10}$,
s is 0, 1, 2 or 3,
t is 0, 1, 2 or 3,
with the proviso that the sum of s+t=3,
u is 0 or 1, and
i is 0 or 1,
wherein the crosslinkable composition cures by hydrosilylation upon exposure to light, at temperatures from 15° C. to 30° C.

17. Silicone compositions of improved storage stability, crosslinkable by hydrosilylation which is initiated by irradiation with light, consisting of:
(A) organosilicon compound(s) comprising Si—C-bonded radicals having aliphatic carbon-carbon multiple bonds;
(B) organosilicon compound(s) comprising hydrogen atoms bonded to Si; and (C) instead of (A) and (B) or in addition to (A), (B), or a mixture of (A) and (B), organosilicon compounds comprising Si—C-bonded radicals having aliphatic carbon-carbon multiple bonds and hydrogen atoms bonded to Si;
(D) a platinum catalyst which is activatable by light of a wavelength of 200 to 500 nm and which comprises a cyclopentadienyl complex of platinum;
(E) at least one organophosphorus compound of one of the formulae)

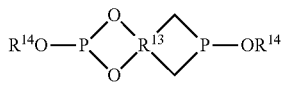

and mixtures thereof, wherein
$R^{10}$ and $R^{11}$ are the same or different and are in each case an alkyl radical of the formula $C_jH_{2j+1}$ where j=2-31 or an alkenyl radical of the formula $C_kH_{2k-1}$ where k=2-31 or an aryl or alkylaryl radical of the formula $-(C_6H_{5-w})-(C_vH_{2v+1})_w$ where v=1-18 and w=0-5,
$R^{12}$ is the same or different and is a monovalent hydrocarbon radical having 1 to 18 carbon atoms,
$R^{13}$ is a tetravalent hydrocarbon radical having 5 to 30 carbon atoms,
$R^{14}$ is the same or different and has the definition of $R^{10}$,
s is 0, 1, 2 or 3,
t is 0, 1, 2 or 3,
with the proviso that the sum of s+t=3,
u is 0 or 1, and
i is 0 or 1,
(F) optionally, one or more fillers, and
(G) optionally, one or more additives selected from the group consisting of plasticizers, fungicides, fragrances, rheology additives, corrosion inhibitors, oxidation inhibitors, organic flame-retardant agents and agents for influencing the electrical properties which are different from the fillers (F), dispersants, solvents, adhesion promoters, color additives, crosslinking auxiliaries, plasticizers which are different from the siloxanes (A), (B) and (C), and heat stabilizers.

18. The process of claim 8, wherein the crosslinkable composition is cured at a temperature of 15° C. to 30° C.

19. The silicone composition of claim 1, wherein the organophosphorus compound is an organophosphorus compound of formula (I) or formula (II) where i, u, and s are 0.

20. The silicone composition of claim 17, wherein the organophosphorus compound is an organophosphorus compound of formula (I) or formula (II) where i, u, and s are 0.

* * * * *